| United States Patent [19] | [11] Patent Number: 4,912,185 |
| Toh | [45] Date of Patent: Mar. 27, 1990 |

[54] CROSS-LINKABLE CASTING COMPOSITIONS

[75] Inventor: Huan K. Toh, Flagstaff Hill, Australia

[73] Assignee: Sola International Holdings Ltd., Lonsdale, Australia

[21] Appl. No.: 124,143

[22] Filed: Nov. 23, 1987

[30] Foreign Application Priority Data

Nov. 21, 1986 [AU] Australia ............................... 9090/86

[51] Int. Cl.$^4$ ........................ C08F 26/02; C08F 20/10
[52] U.S. Cl. .................................. 526/301; 526/323.2
[58] Field of Search ............................ 526/323.2, 301

[56] References Cited

U.S. PATENT DOCUMENTS

| 4,049,634 | 9/1977 | Ko et al. ............................. 526/320 |
| 4,081,308 | 3/1978 | Skoultchi ........................... 526/146 |
| 4,214,026 | 7/1980 | Ibata et al. ......................... 428/228 |
| 4,347,174 | 8/1982 | Nagase et al. . |
| 4,351,922 | 9/1982 | Yoshida et al. .................... 526/323.2 |
| 4,382,135 | 5/1983 | Sinka et al. ........................ 526/323.2 |
| 4,387,157 | 6/1983 | Bronstert et al. .................. 430/275 |
| 4,414,278 | 11/1983 | Cohen et al. ...................... 526/323.2 |
| 4,421,840 | 12/1983 | Lehner et al. ..................... 430/283 |
| 4,533,710 | 8/1985 | Olson et al. ...................... 526/323.2 |
| 4,536,267 | 8/1985 | Ito et al. ........................... 526/323.2 |
| 4,606,994 | 8/1986 | Illers et al. ....................... 430/349 |

FOREIGN PATENT DOCUMENTS

| 168226 | 5/1985 | European Pat. Off. . |
| 3117006 | 10/1986 | Fed. Rep. of Germany . |
| 1453429 | 8/1975 | United Kingdom . |
| 2163443 | 3/1980 | United Kingdom . |

Primary Examiner—Joseph L. Schofer
Assistant Examiner—N. Sarofim
Attorney, Agent, or Firm—Sughrue, Mion, Zinn, Macpeak, and Seas

[57] ABSTRACT

A cross-linkable polymeric casting composition including at least polyoxyalkylene glycol diacrylate or dimethacrylate and at least one polyfunctional unsaturated cross-linking agent. The casting composition may be utilized in the manufacture of plastic optical articles such as video discs and ophthalmic lenses.

16 Claims, No Drawings

CROSS-LINKABLE CASTING COMPOSITIONS

The present invention relates to the manufacture of plastic optical articles such as video discs and ophthalmic lenses. The most widely used plastic ophthalmic lens material is polymerised diethylene glycol bis (allyl carbonate). This polymer has proved a satisfactory material for the manufacture of ophthalmic lenses because of a combination of features, including excellent transmission, resistance to discolouration, high strength and high impact resistance. The material has a reasonable abrasion resistance and can be coated to improve that resistance.

The manufacturing process involves the polymerisation of diethylene glycol bis (allyl carbonate) by curing the material within a pair of glass moulds sealed by a gasket and held together by a clip. The cure times are lengthy and can be as long as 16 hours or more. Such extended cure times not only mean that a large stock of glass moulds is required but that also, warehouse stocks of cast polymerised lenses are high so as to meet order requirements as they arise.

There has been a long felt need for a material which could be cast using the existing arrangements with a considerably reduced cure time while still producing a lens with all the desirable characteristics of those made with diethylene glycol bis (allyl carbonate).

Urethane acrylates and methacrylates have been widely used in the formulation of coating compositions, photosensitive compositions for making flexographic printing plates, adhesives and dental filling materials. In such formulations the urethane material is usually chosen so as to have a high viscosity and low shrinkage and forms the principle component of any formulation.

In order to cast a satisfactory lens by a commerically useful casting process from a composition containing a urethane acrylate or methacrylate, it is necessary to formulate the composition so as to have a viscosity not exceeding approximately 200 cps at 25° C.

Accordingly, it is an object of the present invention to overcome, or at least alleviate, one or more of the difficulties related to the prior art.

Accordingly, the present invention provides a cross-linkable polymeric casting composition including at least one polyoxy alkylene glycol diacrylate or dimethacrylate and at least one poly functional unsaturated cross-linking agent.

The cross-linkable polymeric coating composition in a preferred form may also include a urethane monomer having terminal acrylic and/or methacrylic groups.

The at least one polyoxy alkylene glycol diacrylate or dimethacrylate compound according to the present invention may include ethylene oxide or propylene oxide repeating units in its backbone. An ethylene glycol derivative is preferred.

Preferably from approximately 6 to 11 alkylene oxide repeating units may be included.

A polyethylene glycol dimethacrylate is preferred. A polyethylene glycol dimethacrylate with an average molecular weight of the order of 600 is preferred. One suitable material is that sold under the trade name NKESTER 9G by SHIN NAKAMURA which has an average Molecular weight of 536. The average number of ethylene oxide polymerised units is 9. Alternatively, an NK Ester 6G having an average number of 6 ethylene oxide polymerised units may be used.

Though the use of polyethylene glycol dimethacrylate on its own is exemplified below, it is also possible to use mixtures of polyethylene glycol diacrylates and dimethacrylates. Mixed esters can also be used.

The at least one polyoxy alkylene glycol diacrylate or dimethacrylate component may be present in an amount suitable to provide a viscosity of not greater approximately 200 cps at 25° C. in the final product. The diacrylate or dimethacrylate compound may be present in amounts of from approximately 40% by weight to 60% by weight based on the total weight of the casting composition. The diacrylate or dimethacrylate component is preferably present in amounts of at least approximately 45% by weight, more preferably 50% by weight.

The dimethacrylates are more preferred than the diacrylates as the diacrylates need to be used with care, as with their greater reactivity than the corresponding dimethacrylates, distortion may be introduced into the lens blank as cast due to strain. Any particular diacrylate also tends to be more water absorbing than the corresponding dimethacrylate. It has also been found that as the number of polymerised alkylene oxide groups is increased from six, in the case of both dimethacrylates and diacrylates the water absorption increases and becomes unacceptably high at an average value of 12 alkylene oxide groups per molecule.

Water absorption can occur during tinting in boiling water and can result in cracking subsequent to tinting.

The poly functional unsaturated cross-linking agent according to the present invention may be a tri- or tetra-functional vinyl, an acrylic or methacrylic monomer. The cross-linking agent may be a short chain monomer for example trimethylol propane trimethacrylate, pentaerythritol triacrylate or tetracrylate, or the like. Other polyfunctional cross-linking agents which may be used include

NK ESTER TMPT

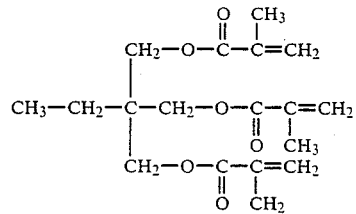

NK ESTER A-TMPT

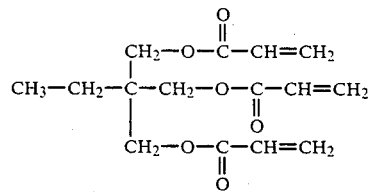

NK ESTER A-TMM-3

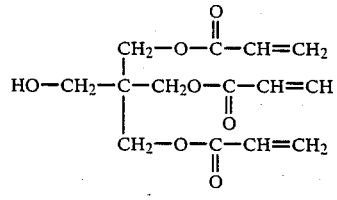

NK ESTER A-TMMT

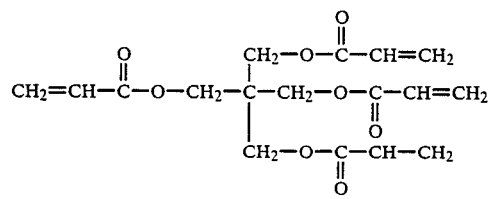

DI-TRIMETHYLOL PROPANE TETRAACRYLATE

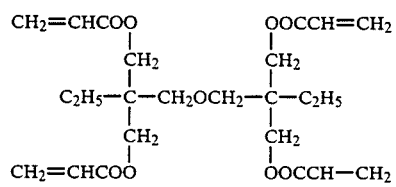

trimethylolpropane triacrylate, pentaerythritrol tetramethacrylate, dipentaerythritol monohydroxypentaacrylate, pentaerythritol triacrylate, ethoxylated trimethylolpropane triacrylate, ethoxylated trimethylolpropane trimethacrylate.

It has been found when operating at the lower end of the preferred range 40 to 60% for the diacrylate or dimethacrylate component that it is preferable to select as the polyfunctional unsaturated cross linking agent, material such as that sold under the trade name SR-454 which is an ethoxylated trimethylol propane triacrylate.

The poly functional unsaturated cross-linking agent may be present in amounts of from approximately 10 to 30% by weight preferably approximately 20% by weight based on the total weight of the casting composition. The weight ratio of cross-linking agent to tetracrylic urethane monomer, when present, is preferably in the range of approximately 1:4 to 2:1.

As stated above, the cross-linkable polymeric coating composition in a preferred form may also include a urethane monomer having terminal acrylic and/or methacrylic groups. The number of such groups can vary from 2 to 6, and we have found that satisfactory materials for use in this invention are those in which the molecular weight of the compound divided by the functionality or number of groups is 200±50. Suitable materials falling within this definition include materials supplied under the trade names U-4H, U-4HA and U-6HA by Shin Nakamura, NF-201 and NF-202 by Mitsubishi Rayon. These monomers are included to improve physical toughness without causing the lens material to become too brittle. Impact resistance is improved without adversely affecting abrasion resistance.

The structures contained within any particular monomer can be selected from those containing aliphatic, aromatic, and cyclic structures of other forms. We have found that in the formulations of the present invention, the tetracrylic urethane monomer gives particularly satisfactory results.

The inclusion of the tetracrylic urethane monomer may provide a product of increased hardness.

The tetracrylic urethane monomer according to a preferred aspect of the present invention may be a compound of the formula

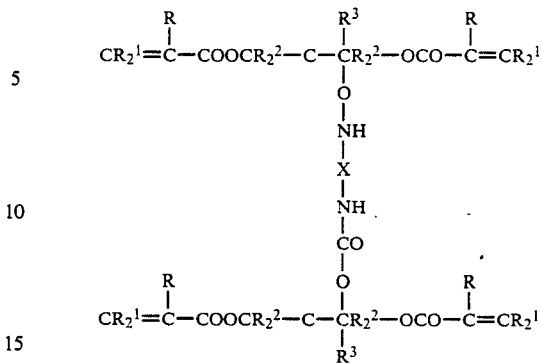

wherein R, $R^1$, $R^2$ and $R^3$ which may be the same or different are selected from hydrogen, alkyl of 1 to 6 carbon atoms or a substituted alkyl of 1 to 6 carbon atoms; and X is an organic residue having 1 to 20 carbon atoms. X may be an aliphatic, alicyclic or aromatic residue. X may be a $C_1$-$C_{20}$ alkyl, alkoxy, alkylamino, alkyl carbonyl alkoxy carbonyl, alkylamido or alkoxy amide group.

X may be substituted with one or more halogen, hydroxyl, nitro, amino, alkyl or alkoxy groups.

The tetracrylic urethane monomer may be present in any suitable amount to provide a desired level of hardness. The tetracrylic urethane monomer may be present in amounts of from 0 to approximately 40% by weight, preferably 10 to 30% by weight based on the total weight of the casting composition.

Where X is an aromatic group, the article formed therefrom may exhibit a high refractive index and be suitable for applications where this is desirable. A urethane monomer having the following structure is preferred:

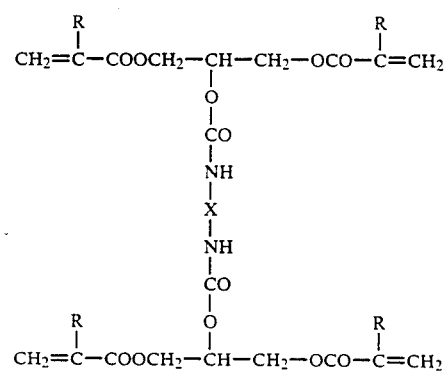

wherein R is a hydrogen atom or a methyl group or a substituted methyl group and X is an organic residue having 2-20 carbon atoms, preferably 6 carbon atoms.

In the above formula, while X may be any of organic residues having 2-20 carbon atoms, it is generally an aliphatic or alicyclic hydrocarbon residue, the backbone of which may be interrupted by oxygen. Specific examples thereof are as follows: Examples of aliphatic hydrocarbon residues include (i) alkylene groups such as $—CH_2CH_2—$, $—(CH_2)_3—$, $—(CH_2)_4—$, $—(CH_2)_6—$.

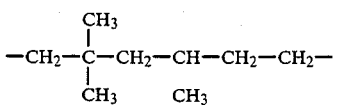

—(CH$_2$)$_9$—, —(CH$_2$)$_{18}$—, —(CH$_2$)$_{11}$—CH$_2$ etc. (ii) alkyloxyalkylene groups such as —C$_2$H$_4$OC$_2$H$_4$—, —(CH$_2$)$_6$—O—(CH$_2$)$_6$ etc. and the like.

The urethane monomer may be produced by reacting 2 moles of a glycerin di(meth)acrylate

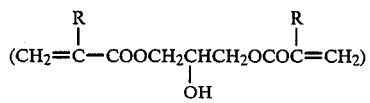

and 1 mole of an organic diisocyanate compound (OCH—X—NCO). The glycerin di(meth)acrylates are known compounds which can be obtained by reacting glycidyl (meth)acrylate and (meth)acrylic acid. The organic diisocyanate compounds are known compounds, many of which are on the market and thus easily available. The organic diisocyanate comply with the definition of X and thus their examples include ethylene diisocyanate, trimethylene diisocyanate, tetramethylene diisocyanate, hexamethylene diisocyanate, 2,2,4-trimethylhexamethylene diisocyanate. The reaction of the glycerin di(meth)acrylate and the organic diisocyanate may be conducted using a catalyst commonly used for reactions of alcohols and isocyanates (e.g. dibutyltin dilaurate) in the absence of a solvent, or by dissolving in a solvent. The solvent used is an organic solvent having no active hydrogen such as methyl chloride, benzene, toluene, etc. The reaction is preferably carried out at a temperature of up to 100° C. (generally 20°–90° C.), thereby free radical polymerisation of the di(meth)acrylate monomer can be prevented, and a reaction time of 1–2 hours affords the monomer almost in a quantitive yield. After the reaction, the monomer may be obtained by removing the reaction solvent.

The cross-linkable casting composition according to the present invention may further include a cross-linking initiator. The cross-linking initiator may be a heat and/or ultraviolet (U.V.) initiator.

The compositions are preferably cured by a combination of UV radiation and heat. The combination of UV radiation and heat may reduce the possibility of incomplete curing for example due to the phenomenon known as "radical trapping".

The composition, with the addition of approximately 0.5 to 2.0% by weight of cross-linking initiator may be exposed to UV radiation for between 0.5 and 10 seconds.

Any commercially viable UV curing system may be used. We have used a Fusion System with microwave driven lamps. A number of fusion bulbs with different output Spectra may be considered. Presently we prefer the "D" bulb and the "V" bulb.

One source we have found satisfactory is a 10 inch, 300 watt/inch mercury lamp. The mould assembly is then heated to 100° C. for one hour or the lens may be removed from the assembly and heated in air for about one hour at 100° C. This means that fully cured lenses can be manufactured, if desired, in about one hour. Heat curing can also be used without any use of U.V. radiation.

Typically 2–4 passes under the UV lamps plus an hour of heat treatment at 100° C. completes the cure.

Any suitable UV initiator may be used. An initiator available under the trade designation Irgacure 184 has been found to be satisfactory. More than one curing agent may be present. It has been possible to operate with a relatively low level of initiator of between 0.05 and 0.2% by weight.

A range of photoinitiators avialable commercially can be used, depending on sample thickness, type of UV lamp used and the absorption wavelength of the monomer mix.

The following photoinitiators have been found to be suitable.

Alcolac Vicure 10-isobutyl benzoin ether
Alcolac Vicure 30-isopropyl benzoin ether
Alcolac Vicure 55-methyl phenyl glyoxylate
Ciba Geigy Irgacure 184-1-hydroxy cyclohexyl phenyl ketone
Ciba Geigy Irgacure 651-benzildimethyl ketal
Ciba Geigy Irgacure 907-2-methyl-1-[4-(methylthio)-phenyl]-2-morpholino-propanone-1
Merck Darocur 1664
Rohm Catalyst 22

A mixture of the above may also be used. Additionally, combination of photoiniator mixtures or photoinitiator mixtures with a heat induced free radical initiator such as peroxides, peroxypercabonates or an azo compound may also be employed.

As an alternative to photo curing a heat curing may be used, for example 1,1 di-tert butyl peroxy-3,3,5-trimethylcyclohexane or secondary isopropyl percarbonate.

Other additives may be present which are conventionally used in casting compositions such as inhibitors, dyes, UV stabilisers and materials capable of modifying refractive index. Mould release agents can be added but they are in general not required with the compositions used in the method of the present invention. Such additives may include:

UV Absorbers including
Ciba Geigy Tinuvin P-2(2'-hydroxy-5'methyl phenyl) benzotriazole
Cyanamid Cyasorb UV 531-2-hydroxy-4-n-octoxybenzophenone
Cyanamid Cyasorb UV5411-2(2-hydroxy-5-t-octylphenyl)benzotriazole
Cyanamid UV 2098-2 hydroxy-4-(2-acryloyloxyethoxy)benzophenone
National S+C Permasorb MA-2 hydroxy-4-(2-hydroxy-3-methacryloxy)propoxy benzophenone
Cyanamid UV24-2,2'-dihydroxy-4-methoxybenzophenone
BASF UVINUL 400-2,4 dihydroxy-benzophenone
BASF UVINUL D-49-2,2'-dihydroxy-4,4'-dimethoxybenzophenone
BASF UVINUL D-50-2,2',4,4' tetrahydroxy benzophenone
BASF UVINUL D-35-ethyl-2-cyano-3,3-diphenyl acrylate
BASF UNINYL N-539-2-ethexyl-2-cyano-3,3-diphenyl acrylate
Ciba Geigy Tinnuin 213
Hindered amine light stabilizers (HALS), including
Ciba Geigy Tinuvin 765/292-bis(1,2,2,6,6-pentamethyl-4-piperidyl)sebacate
Giba Geigy 770-bis(2,2,6,6-tetramethyl-4-piperidinyl) sebacate Antioxidants including
Ciba Geigy Irganox 245-triethylene glycol-bis-3-(3-tert butyl-4-hydroxy-5-methyl phenyl)propionate
Irganox 1010-2,2-bis[[3-[3,4-bis(1,1-dimethylethyl)-4-hydroxyphenyl]-1-oxopropoxy]methyl]-1,3-propanediyl 3,5-bis (1,1-dimethyl ethyl)-4-hydroxy benzene propanoate
Irganox 1076-octadecyl 3-(3',5'-di=tert=butyl(-4'-hydroxy phenyl) propionate
Anticolouring agents including
Triphenyl phosphine
9,10 dihydro-9-oxa-10-phosphaphenanthrene-1-oxide
Cure modifiers including
Dodecyl mercaptan
Butyl mercaptan
Thiophenol Other monomeric additives can be present in amounts up to 10% by weight as diluents, and include monomers such as methacrylic acid, vinyl silanes, methyl allyl, hydroxy ethyl, benzyl and phenyl methacrylate, styrene and N-vinyl pyrrolidone. Other monomeric additives may be included to improve processing and/or material properties, these include:

methacrylic acid, maleic anhydride, acrylic acid
adhesion promoters/modifiers such as Sartomer 9008, Sartomer 9013, Sartomer 9015 etc.
dye-enhancing, pH-adjusting monomers like Alcolac SIPOMER 2MIM
a charge-reducing cationic monomer to render the material more antistatic, example Sipomer Q5-80 or Q9-75
hydrophobic comonomers: Shin Nakamura NPG, P9-G etc. to reduce the water adsorption of the material
refractive index modifiers such as benzyl or phenyl methacrylates to adjust the refractive index to the desired value.

In a further aspect of the present invention there is provided a polymeric article formed from a cross linkable casting composition as described above. The polymeric article may be an optical article. The optical article may provide characteristics equal to or greater than those achievable with articles made from diethylene glycol bis(allyl carbonate) but with a considerably reduced cure time and substantially increased throughput.

The optical articles prepared by the method of this invention include camera lenses, ophthalmic lenses and video discs.

The casting composition may be formed into a suitable article by mixing in a convenient vessel the components making up the material, and then adding the curing catalyst and/or photo-initiator. The mixed material is then degassed or filtered. As the curing time is substantially reduced the casting process may be undertaken on a continuous or semi-continuous basis.

The present invention will now be more fully described with reference to the accompanying examples. It should be understood, however, that the description following is illustrative only and should not be taken in any way as a restriction on the generality of the invention described above.

The following Examples 1 to 4 are provided for purposes of comparison. In all cases the casting material was used to fill the space between a pair of glass moulds separated by a plastic gasket at their periphery and held together by a clip.

| EXAMPLE NUMBER | CASTING MATERIAL | CURING CATALYST/ INITIATOR | CURING TEMP. AND TIME | YELLOWNESS INDEX (1.8 m) THICK PLANO LENS | % TRANSMISSION | BARCOL HARDNESS | TABAR ABRASION 200 CYCLES W 500 GMS LOAD % HAZE | SHRINKAGE CALCU. MONOMER VALUES % |
|---|---|---|---|---|---|---|---|---|
| 1. | Diethylene Glycol Bis (allyl carbonate) | 3.0% SIP | 40-90° C. 17 Hours | 0.62 | 92.0 | 31.8 | 19.0 | 14.0 |
| 2. | Example 1 coated with Abrasion Resistant coating | | | 0.78 | 91.3 | 33.8 | 6.7 | 14.0 |
| 3. | 20% PEGM 50% U-4HA 30% TMPT | 2% IRGACURE 184 | 0.5 Secs. UV 1 Hour 100° C. | 2.21 | 90.9 | 56.3 | 6.8 | 10.4 |
| 4. | 40% PEHM 40% Difunctional Urethane Acrylate (Sartomer 9504) 20% TMPT | 0.2% SIP | 40-90° C. 5 Hours | Cloudy | Cloudy | Soft/ Rubber | — | — |
| 5. | 80% PEGM 20% TEGM | 0.1% SIP | 40-90° C. 5 Hours | 0.90 | 91.7 | 1.1 | 6.8 | 8.0 |
| 6. | 40% PEGM 40% U-4HA 20% TMPT | 0.1% SIP | 40-90° C. 5 Hours | 0.77 | 91.9 | 47.5 | 6.8 | 9.2 |
| 7. | 60% PEGM 15% U-4HA 25% TMPT | 0.2% SIP | 40-90° C. 5 Hours | 0.76 | 91.9 | 28.5 | 6.5 | 8.0 |
| 8. | 50% PEGM 20% U-4HA 30% TMPT | 0.2% SIP | 40-90° C. 5 Hours | 0.78 | 91.9 | 43.6 | 7.1 | 9.2 |
| 9. | 50% PEGM 20% U-4HA | 0.5% IRGACURE | 0.5 Secs UV + 1 hour | 1.05 | 92.3 | 47.0 | 6.6 | 9.2 |

-continued

| EXAMPLE NUMBER | CASTING MATERIAL | CURING CATALYST/ INITIATOR | CURING TEMP. AND TIME | YELLOWNESS INDEX (1.8 m) THICK PLANO LENS | % TRANS- MISSION | BARCOL HARD- NESS | TABAR ABRASION 200 CYCLES W 500 GMS LOAD % HAZE | SHRINK- AGE CALCU. MONOMER VALUES % |
|---|---|---|---|---|---|---|---|---|
| 10. | 30% TMPT 50% PEGM 30% U-4HA 20% TMPT | 184 0.5% IRGACURE 184 | at 100° C. 0.5 secs UV + 1 hour at 100° C. (2.2 mm) | 2.20 | — | 44.0 | — | — |
| 11. | 60% 4G 20% U-4HA 20% TMPT | 0.1% SIP | 40-90° C. 5 hours | 1.10 | 91.8 | 49.2 | 22.0 | 12.6 |
| 12. | 50% 4G 30% U-4HA 20% TMPT | 0.1% SIP | 40-90° C. 5 hours | 1.25 | 91.7 | 53.4 | 20.1 | 12.3 |
| 13. | 30% 23G 30% 3G 15% U-4HA 25% TMPT | 0.1% SIP | 40-90° C. 5 hours | 0.80 | 91.2 | 28.5 | 27.5 | 12.4 |
| 14. | 20% 23G 40% 3G 20% U-4HA 20% TMPT | 0.1% SIP | 40-90° C. 5 hours | 0.86 | 91.2 | 40.1 | 27.2 | 12.6 |
| 15. | 55% 9G 20% TMPT 25% NF201 | 0.2% Vicure 55 | UV + 1 hr 100° C. | 0.86 | 91.5 | 24.2 | 12.0 | 7.9 |
| 16. | 55% 9G 20% TMPT 25% NF202 | 0.2% Vicure 55 | UV + 1 hr 100° C. | 0.63 | 91.6 | 28.7 | 15.2 | 7.9 |
| 17. | 60% 9g 20% TMPT 20% U-6HA | 0.2% SIP | 40-90° C. 5 hour | 0.60 | 92.2 | 24.2 | 7.0 | 8.8 |
| 18. | 60% 6G 20% U-4HA 20% TMPT | 0.1% SIP | 40-90° C. 5 hours | 1.10 | 92.4 | 38.5 | 8.5 | — |
| 19. | 60% 6G 20% U-4H 20% TMPT | 0.1% SIP | 40-90° C. 5 hours | 1.15 | 92.4 | 40.5 | 9.4 | — |
| 20. | 60% 9G 20% U-4H 20% TMPT | 0.1% SIP | 40-90° C. 5 hours | 0.72 | 92.4 | 28.8 | 7.6 | — |
| 21. | 50% 9G 30% U-4H 20% TMPT | 0.1% SIP | 40-90° C. 5 hours | 0.83 | 92.5 | 40.2 | 7.6 | — |
| 22. | 50% 6G 30% U-4H 20% TMPT | 0.1% SIP | 40-90° C. 5 hours | 1.20 | 92.4 | 46.4 | 9.2 | — |
| 23. | 40% 9G 30% U-4H 20% ETMPT | 0.1% SIP | 40-90° C. 5 hours | 0.94 | 92.6 | 43.6 | 7.5 | — |
| 24. | 40% 9G 20% U-4H 40% ETMPT | 0.1% SIP | 40-90° C. 5 hours | 1.06 | 92.6 | 34.8 | 9.4 | — |
| 25. | 60% 9G 20% ETMPT 20% U-4HA | 0.1% SIP | 40-90° C. 5 hours | 0.93 | 92.8 | 12.9 | 6.2 | — |
| 26. | 60% 9G 20% ETMPT 20% U-4H | 0.1% SISP | 40-90° C. 5 hours | 0.87 | 92.8 | 13.1 | 11.3 | — |
| 27. | 60% 6G 20% ETMPT 20% U-4HA | 0.1% SIP | 40-90° C. 5 hours | 1.30 | 92.1 | 28.5 | 8.5 | — |
| 28. | 60% 6G 20% ETMPT 20% U-4H | 0.1% SIP | 40-90° C. 5 hours | 1.27 | 92.5 | 31.0 | 8.7 | — |
| 29.* | 40% U-6HA 20% ATMMT 40% 9G | 0.1% SIP | 40-90° C. 5 hours | 0.90 | 92.3 | 39.8 | 4.7 | — |
| 30.* | 40% U-6HA 20% ATMMT 40% 4G | 0.1% SIP | 40-90° C. 5 hours | 1.33 | 91.8 | 50.4 | 7.6 | — |
| 31.* | 40% U-6HA 20% ATMMT | 0.1% SIP 5 hours | 40-90° C. | 1.53 | 91.6 | 51.6 | 9.1 | — |

-continued

| EXAMPLE NUMBER | CASTING MATERIAL | CURING CATALYST/ INITIATOR | CURING TEMP. AND TIME | YELLOWNESS INDEX (1.8 m) THICK PLANO LENS | % TRANS- MISSION | BARCOL HARD- NESS | TABAR ABRASION 200 CYCLES W 500 GMS LOAD % HAZE | SHRINK- AGE CALCU. MONOMER VALUES % |
|---|---|---|---|---|---|---|---|---|
| | 40% 3G | | | | | | | |

PEGM = polyethylene glycol dimethacrylate with 9 polymerisation units of ethylene glycol
U-4HA = tetra functional urethaneacrylate of the general formula given above sold under the trade name by SHIN NAKAMURA
TMPT = trimethyol propane trimethacrylate
SIP = Secondary Isopropyl Percarbonate
3G = polyethylene glycol dimethacrylate with 3 ethylene oxide units.
4G = polyethylene glycol dimethacrylate with 4 ethylene oxide units.
23G = polyethylene glycol dimethacrylate with 23 ethylene oxide units.
NF201 = aliphatic urethane dimethacrylate produced by Mitsubishi Rayon Corporation
NF202 = aromatic urethane dimethacrylate produced by Mitsubishi Rayon Corporation
U-6HA = urethane oligomer from Shin Nakamura with 6 polymerizable groups per molecule.
6G = polyethylene glycol dimethacrylate with 6 ethylene oxide units
U-4H = aliphatic urethane tetramethacrylate oligomer manufactured by Shin Nakamura
ETMPT = ethoxylated trimethylolpropane trimethacrylate
ATMMT = pentaerythritol tetraacrylate
*Examples 29–31 have unacceptably high viscosities of 1110, 582 and 446 cp (25° C.) respectively.

The above examples demonstrate that lenses cast in accordance with the method of the present invention have an abrasion resistance of the same order as a lens cast from diethylene-glycol bis (allyl carbonate) which has been coating with an abrasion resistant coating. It can be seen from Example 5, that the absence of the urethane acrylate gave a product with a low level of hardness measured on the Barcol scale. Such flexible lenses may provide useful products in the safety field. The unacceptability of a difunctional acrylate in combination with a polyethylene glycol dimethacrylate and TMPT is demonstrated by comparison of Examples 4 and 6. All significant characteristics of the lens made in accordance with the invention can be seen to be equivalent or superior to a lens cast from diethylene glycol bis (allyl carbonate).

The following examples illustrate how the relevant proportions of the polyethylene glycol monomer and the urethane monomer can affect the viscosity of the monomer mixture used for casting lenses:

| | Monomer Mixture % by weight | | | Viscosity at |
|---|---|---|---|---|
| | PEGM | U-4HA | TMPT | CPS at 25 Degrees C |
| 1. | 70 | 10 | 20 | 52.4 |
| 2. | 65 | 15 | 20 | 63.7 |
| 3. | 60 | 20 | 20 | 76.8 |
| 4. | 55 | 25 | 20 | 96.6 |
| 5. | 50 | 30 | 20 | 123.9 |
| 6. | 40 | 40 | 20 | 207.9 |
| 7. | 30 | 50 | 20 | 377.7 |
| 8. | 20 | 60 | 20 | 796 |

It can be seen that the compositions which are outside the scope of the invention have a viscosity which would render casting difficult.

It will be appreciated that various modifications and/or alterations may be introduced into the constructions and arrangements of parts previously described without departing from the spirit or ambit of the present invention.

I claim:

1. A cross-linkable polymeric casting composition comprising:
    (A) at least polyoxyalkylene glycol diacrylate or dimethacrylate compound;
    (B) at least one polyfunctional unsaturated cross-linking agent; and
    (C) a urethane monomer having from two to six terminal acrylic and/or methacrylic groups;
    wherein a weight ratio of said cross-linking agent to said urethane monomer is in the range of from approximately 1:4 to 2:1.

2. A casting composition according to claim 1 wherein the diacrylate or dimethacrylate compound includes ethylene oxide or propylene oxide repeating units in its backbone.

3. A casting composition according to claim 2 wherein the diacrylate or dimethacrylate compound includes approximately 6 to 20 ethylene oxide repeating units in the backbone thereof.

4. A casting composition according to claim 3 wherein the diacrylate or dimethacrylate compound is a polyethylene glycol dimethacrylate with an average molecular weight of the order of 600.

5. A casting composition according to claim 2 wherein the diacrylate or dimethacrylate compound is present in amounts of from approximately 40% by weight to 60% by weight based on the total weight of the casting composition.

6. A casting composition according to claim 1 wherein the urethane monomer is a tetracrylic urethane monomer.

7. A casting composition according to claim 1 wherein the polyfunctional unsaturated cross-linking agent is a tri- or tetrafunctional vinyl, acrylic or methacrylic monomer.

8. A casting composition according to claim 7 wherein the polyfunctional unsaturated cross-linking agent is selected from trimethylol propane trimethacrylate, pentarethritol triacrylate or pentarethritol tetracrylate.

9. A casting composition according to claim 8 wherein the polyfunctional unsaturated cross-linking agent is present in amounts from approximately 10 to 30% by weight based on the total weight of the casting composition.

10. A casting composition according to claim 6 wherein the urethane monomer is a tetracyclic urethane monomer of the formula

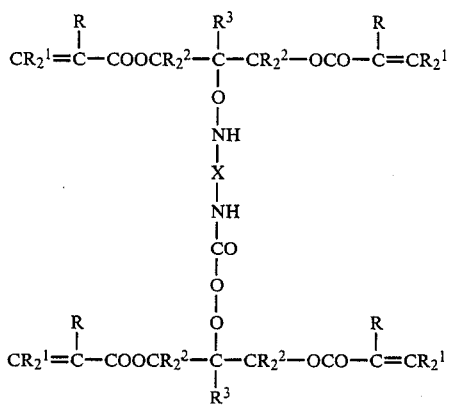

wherein R, $R^1$, $R^2$ and $R^3$ which may be the same or different are selected form hydrogen, alkyl of 1 to 6 carbon atoms or a substituted alkyl of 1 to 6 carbon atoms; and X is an organic residue having 1 to 20 carbon atoms.

11. A casting composition according to claim 10 wherein X is selected from $C_1$–$C_{20}$ alkyl, alkoxy, alkylamino, alkyl carbonyl alkoxy carbonyl, alkylamido or alkoxy amide group; which may be substituted or unsubstituted with one or more halogen, hydroxyl, nitro, amino, alkyl or alkoxy groups.

12. A casting composition according to claim 11 wherein the tetracrylic urethane monomer is present in amounts of from 10 to approximately 40% by weight based on the total weight of the casting composition.

13. A casting composition according to claim 12 wherein the urethane monomer is a compound of the formula

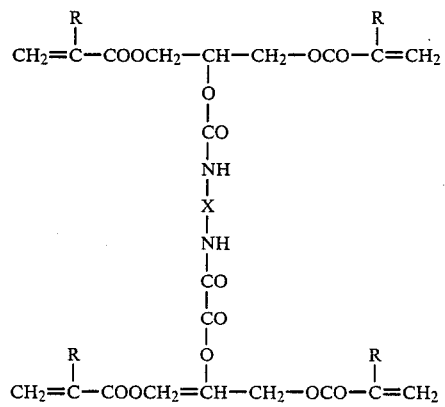

wherein R is a hydrogen atom or a methyl group or a substituted methyl group and X is an organic residue having 2 to 20 carbon atoms.

14. A casting composition according to claim 1 further including a heat and/or ultraviolet cross-linking initiator.

15. A casting composition according to claim 14 wherein the cross-linking initiator is selected from Irgacure 184; 1,1 di-tert butyl peroxy-3,3,5-trimethylcyclohexane or secondary isopropyl percarbonate.

16. A polymeric article formed from a cross-linkable polymeric casting composition according to claim 1.

* * * * *